United States Patent
Faber

(10) Patent No.: US 9,165,464 B2
(45) Date of Patent: *Oct. 20, 2015

(54) METHOD AND DEVICE FOR PROVIDING ASSISTANCE DURING A PARKING MANEUVER OF A VEHICLE

(71) Applicant: Robert Bosch GmbH, Stuttgart (DE)

(72) Inventor: Petko Faber, Reningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 21 days.

This patent is subject to a terminal disclaimer.

(21) Appl. No.: 13/626,697

(22) Filed: Sep. 25, 2012

(65) Prior Publication Data
US 2014/0085111 A1    Mar. 27, 2014

Related U.S. Application Data

(63) Continuation of application No. 11/991,875, filed as application No. PCT/EP2006/065230 on Aug. 10, 2006, now Pat. No. 8,299,941.

(30) Foreign Application Priority Data

Sep. 16, 2005 (DE) .......................... 10 2005 044 270

(51) Int. Cl.
| B60Q 1/48 | (2006.01) |
| G08G 1/0962 | (2006.01) |
| B62D 15/02 | (2006.01) |
| G08G 1/16 | (2006.01) |

(52) U.S. Cl.
CPC ............ *G08G 1/0962* (2013.01); *B62D 15/027* (2013.01); *B62D 15/0285* (2013.01); *G08G 1/168* (2013.01)

(58) Field of Classification Search
CPC ....... B52D 15/028; G08G 1/168; G08G 1/16; B60R 1/00; B60R 2300/806; B60Q 9/005
USPC .............. 304/932.2, 435, 988, 937, 938, 903; 348/148, 149
See application file for complete search history.

(56) References Cited

U.S. PATENT DOCUMENTS

| 5,587,938 A * | 12/1996 | Hoetzel .............................. 703/2 |
| 6,483,429 B1 * | 11/2002 | Yasui et al. ................... 340/435 |
| 2003/0227378 A1 * | 12/2003 | Nakai et al. ................... 340/435 |
| 2005/0043871 A1 | 2/2005 | Endo et al. |
| 2005/0195071 A1 * | 9/2005 | Ewerhart et al. ............. 340/435 |
| 2005/0270177 A1 * | 12/2005 | Mori et al. ................. 340/932.2 |

FOREIGN PATENT DOCUMENTS

| DE | 100 45 616 | 3/2002 |
| DE | 102 57 722 | 7/2004 |
| JP | 2002/154396 | 5/2002 |
| WO | 2005/009787 | 2/2005 |

* cited by examiner

*Primary Examiner* — Hoi Lau
(74) *Attorney, Agent, or Firm* — Kenyon & Kenyon LLP

(57) ABSTRACT

A method for providing assistance during a parking maneuver of a motor vehicle into a parking space. The parking space and a boundary object located in the area of the parking space being detected by a sensor array while the vehicle is driving by the parking space. To simplify the parking maneuver, a boundary object type is assigned to the detected boundary object, and parking information relating to the feasibility of a parking maneuver into the parking space is generated. Furthermore, a device for providing assistance during a parking maneuver of a motor vehicle, into a parking space, having a sensor array for detecting a parking space and a boundary object located in the area of the parking space while the vehicle is driving by the parking space, having an analyzer unit connected to the sensor array, and having a memory unit.

18 Claims, 3 Drawing Sheets

METHOD AND DEVICE FOR PROVIDING ASSISTANCE DURING A PARKING MANEUVER OF A VEHICLE

CROSS-REFERENCE TO RELATED APPLICATIONS

This application is a continuation of U.S. patent application Ser. No. 11/991,875, filed on Aug. 11, 2009, which is a national phase application based on international application PCT/EP2006/065230, filed on Aug. 10, 2006, which claims foreign priority benefits under 35 U.S.C. §119 to German Patent Application No. 10 2005 044 270.6, filed on Sep. 16, 2005, all of which are hereby incorporated by reference in their entirety.

FIELD OF THE INVENTION

The present invention relates to a method for providing assistance during a parking maneuver of a vehicle, in particular a motor vehicle, into a parking space, the parking space being detected when the vehicle drives past the parking space and a boundary object situated in the area of the parking space being detected by a sensor array. Furthermore, the present invention relates to a device, in particular for performing a method as defined above, for providing assistance during a parking maneuver of a vehicle, in particular of a motor vehicle, into a parking space having a sensor array for detecting a parking space and a boundary object situated in the area of the parking space while the vehicle is driving by the parking space and having an analyzer unit connected to the sensor array and having a memory unit.

BACKGROUND INFORMATION

The method defined above is, for example, a method conventionally known as part of Parking Space Localization (PSL), which assists a driver as the operator of a motor vehicle in searching for a parking space large enough for his vehicle in view of its geometric dimensions. Parking space localization may cooperate with an apparatus for semiautomatic parking, in which the driver must operate the gas pedal and the brake pedal of the vehicle, but steering of the vehicle may be performed either by the driver or automatically. The device defined above may be, for example, such an apparatus as that mentioned above, which guides the motor vehicle into a selected parking space and is known by the term semi-autonomous parking assistant (SPA). The semi-autonomous parking assistant calculates a suitable trajectory for parking the vehicle in the parking space and informs the driver, e.g., with the help of acoustic signals, about action he may take to satisfactorily park the vehicle in the parking space. One principle here is that the vehicle must not drive over front, rear, or side parking space boundaries that form boundary objects. This may also require intervention by the driver based on his own perception and judgment.

In addition, DE 102 57 722 A1 discusses a parking assistant for a vehicle in which a measurement unit is provided for detecting parking spaces while the vehicle is driving by the parking spaces. The parking assistant has a memory unit for storing properties of parking spaces and an output unit for output of information about the parking spaces. The output unit may have a display surface, and which may be only parking spaces which are suitable for parking the vehicle based on size will be displayed on the display surface. Unsuitable parking spaces should or may be suppressed in the display and their data should be deleted from the memory unit. There is no differentiation with regard to possible boundary objects bordering the parking space.

DE 100 45 616 A1 discusses a method for automatic parking of a motor vehicle, whereby a parking space is measured, a parking strategy is calculated, and this information is conveyed to the driver of the vehicle. In this method, the environment of the vehicle is recorded by a video camera and displayed on a display screen. The driver should be able to select a desired parking space to be approached by touching the display screen.

SUMMARY OF THE INVENTION

An object of the exemplary embodiments and/or exemplary methods of the present invention is to provide a method of the type defined above that will further simplify the parking maneuver and make it more reliable. In addition, the object of the exemplary embodiments and/or exemplary methods of the present invention is to create a device for simpler and more reliable performance of the parking maneuver.

The first object is achieved according to the exemplary embodiments and/or exemplary methods of the present invention with a method of the type defined above, a boundary object type being assigned to the boundary object detected and parking information about the feasibility of a parking maneuver into the parking space being generated as a function of the assigned boundary object type and the position of the boundary object in the area of the parking space.

The second object defined above is achieved according to the exemplary embodiments and/or exemplary methods of the present invention by a device of the type defined above, boundary object types being stored in the memory unit and parking information about the feasibility of a parking maneuver into the parking space being generated by the analyzer unit as a function of an assignment of one of the stored boundary object types to the detected boundary object and as a function of the position of the boundary object in the area of the parking space.

The exemplary embodiments and/or exemplary methods of the present invention is suitable in general for motor vehicles. It may be used particularly well for motor vehicles, namely for both passenger vehicles and commercial vehicles, because of the dwindling amount of parking space available, in particular in the public transportation area. The exemplary embodiments and/or exemplary methods of the present invention may be part of a semi-autonomous parking assistant for a motor vehicle. With the method according to the present invention, parking information is advantageously generated by differentiating the boundary object with regard to various types of boundary objects and at the same time taking into account the geometric position, i.e., the geometric coordinates of the boundary object in the area of the parking space, this information including a qualitative statement about the parking space.

In this way, the parking information, which in a simple case includes one of the two statements "parking possible" or "parking impossible," may take into account, for example, the fact that a boundary object of the tree type is accepted as a front parking space boundary but is not acceptable as a rear parking space boundary or is acceptable only when there is a much greater parking space length than the length of the vehicle, so that access to the trunk of the vehicle is not hindered. According to another example, it is possible with the exemplary embodiments and/or exemplary methods of the present invention to take into account the fact that a curb intersecting the center of the parking space, essentially representing a not insurmountable obstacle for the vehicle, results in inadequate suitability of that parking space if the vehicle has wheels with light metal rims that are susceptible to damage.

In addition to the quantitative inspection of the parking space known from the related art based only on the geometric dimensions of the parking space, the exemplary embodiments and/or exemplary methods of the present invention in comparison with the related art ensures that additional circumstances pertaining to the parking space will also be taken into account, in particular the topography of the parking space. The exemplary embodiments and/or exemplary methods of the present invention advantageously also takes into account the qualitative characteristics of the parking space. With the exemplary embodiments and/or exemplary methods of the present invention, the entire parking scene including the parking space is interpreted and it is subsequently possible to decide on the basis of this interpretation whether a potential parking space is actually suitable for a parking maneuver.

The area of the parking space in which boundary objects are taken into account according to the exemplary embodiments and/or exemplary methods of the present invention includes not only the parking space in the narrower sense, i.e., the actual footprint claimed directly by the vehicle after parking, but also its indirect environment, including the parking space boundaries. The term "boundary object" in general means that this is an object that is potentially suitable for limiting or restricting a parking maneuver into that parking space. Accordingly, it need not necessarily be an object that is a parking space boundary in the geometric sense, e.g., a side wall. Various predetermined boundary object types may be stored in a memory unit, for example, such as that provided in the device according to the present invention.

There may be essentially any type and number of boundary object types; for example, boundary object types may include: passenger vehicle, truck, bicycle or motorcycle, tree, bush, shrub, hedge, post, lamp post, curb, manhole cover, wall, fence, railing, building material, trench, mailbox, trashcan, a pillar for placards, a building, tree guard, bicycle stand, flower basket, traffic island, person. A catalog of boundary object types stored in the memory unit may be variable and supplementable. The parking information may be, for example, in the form of a signal—optionally to be processed further—to the analyzer unit, which may also include the aforementioned memory unit, of the device according to the present invention or to a display unit in a passenger space of the vehicle. In the simplest case, e.g., when the parking space does not appear to be suitable for parking because of the type and position of the boundary objects, the parking information may include, for example, the fact that there is no signal. On the whole, the method and the device according to the present invention increase the reliability and precision of the assistance in the parking maneuver.

Unsuccessful parking attempts and those that do not lead to the intended goal are ruled out with the exemplary embodiments and/or exemplary methods of the present invention, and the vehicle and operator, in particular the driver of the vehicle, are treated as gently as possible. The exemplary embodiments and/or exemplary methods of the present invention avoids messages to the driver about parking spaces that may not be used, although at first glance they might seem suitable for parking merely on the basis of their geometric dimensions.

The parking information may advantageously be made more precise if the area of the parking space is subdivided into several segments and if, for each segment, a boundary object type is assigned to a boundary object detected in that segment.

If the area of the parking space is subdivided into an arrangement of 3×3 segments, this is particularly advantageous for comprehensive information about the parking space while at the same time having a comparatively low detection and processing complexity. Such an arrangement may be illustrated by a 3×3 matrix, for example, for simple further processing. The central segment in the middle may include the actual footprint forming the potential space for parking, and the surrounding eight segments include the front, rear, and side parking space boundaries including the parking space boundary corners.

For a particularly high informational content and to make the parking information even more precise, it is advantageous if a parking space pattern of the parking space, including all segments, each with the assigned boundary object type, is compared with acceptable parking space patterns, and if the parking information is generated as a function of the comparison of the parking space pattern with the acceptable parking space patterns. The acceptable parking space patterns may be stored in the memory unit. The parking space patterns may each be described in a simple manner by a numerical sequence, a position in the numerical sequence indicating an assigned segment of the area of the parking space and a number at that position indicating the boundary object type of a boundary object situated in that segment. The acceptable parking space patterns may be stored in the memory unit in the form of a look-up table including all conceivable acceptable parking space patterns. This is advantageous in particular when the number of possible interpretations of a parking scene is comparatively low, despite a comparatively large number of possible boundary object types.

The method according to the present invention is adaptable particularly well and automatically, e.g., to changing ambient conditions, if a parking space pattern of the parking space including the boundary object type assigned in each case is compared with acceptable relationships of boundary object types of several boundary objects detected in the area of the parking space and if the parking information is generated as a function of the comparison of the parking space pattern with the acceptable relationships of boundary object types. It is thus possible to avoid merely storing a limited number of acceptable parking space patterns in the memory unit. Use of defined rules which describe the acceptable relationships is advantageous if an increase in the quantity of acceptable boundary object types is necessary and/or desired.

A parking scene may be interpreted in such a way that an arrangement like that described by an n-tupel [A, K] is assumed, where A denotes the quantity of all detected boundary objects and K is the quantity of relationships between the elements of quantity A, where A describes the relationships of the boundary objects with regard to a contextual influence on the individual boundary objects. The possible combinations, which may be parameterizable, of assignments of boundary objects to possible interpretations (suitable/not suitable for a parking maneuver) are assessed by the quantity K of relationships. In a first step, the quantity of boundary object types that are acceptable as a longitudinal boundary of a parking space and are acceptable as a side boundary for a parking space is to be specified.

Generous adaptation to individual wishes and requirements of an operator of a vehicle may be advantageously achieved in that at least a portion of the acceptable parking space pattern is specified by an operator of a vehicle before detection of the parking space. The operator may specify a complete parking space pattern or may limit himself to information that he considers especially important, e.g., to rule out the suitability of a parking space when there is a hedge in a segment covering a parking space boundary on the longitudinal side of the vehicle to avoid scratching the vehicle when parking, for example. At the same time, however, a hedge may be accepted as a front and/or rear parking space boundary.

It is conceivable that the parking information thereby generated is used only in the analyzer unit for further processing and assistance in the parking maneuver. However, it is of particular advantage for a comprehensive message of parking options to be transmitted to the operator of the vehicle when the parking information is transmitted to the operator of the vehicle. The information may be transmitted visually and/or acoustically.

Starting from this parking information, a parking trajectory into the parking space is advantageously determined by the analyzer unit in particular. If the parking space is unsuitable for parking, determination of the parking trajectory will not usually involve determination of a parking trajectory and this circumstance may additionally be imparted to the operator of the vehicle via an output means.

It is advantageous for easy operability of the device according to the present invention and adaptation of the device to the individual wishes and needs of an operator if an input means for input of at least part of an acceptable parking space pattern into the memory unit by an operator of the vehicle is provided. The input means may include, for example, a keypad and/or a touch screen and/or a voice input device.

For comprehensive information for the operator of the vehicle, output means that may include, for example, a display screen and/or a loudspeaker would be advantageous for transmitting the parking information to the operator of the vehicle.

For high operating reliability with an inexpensive design of the device according to the present invention at the same time, it is advantageous if the sensor array has at least one distance measuring sensor, in particular an ultrasonic sensor.

Exemplary embodiments of the present invention are shown schematically in the drawings and are described in greater detail below, with the corresponding elements in all figures being labeled with the same reference numerals.

DETAILED DESCRIPTION

Figure 1:
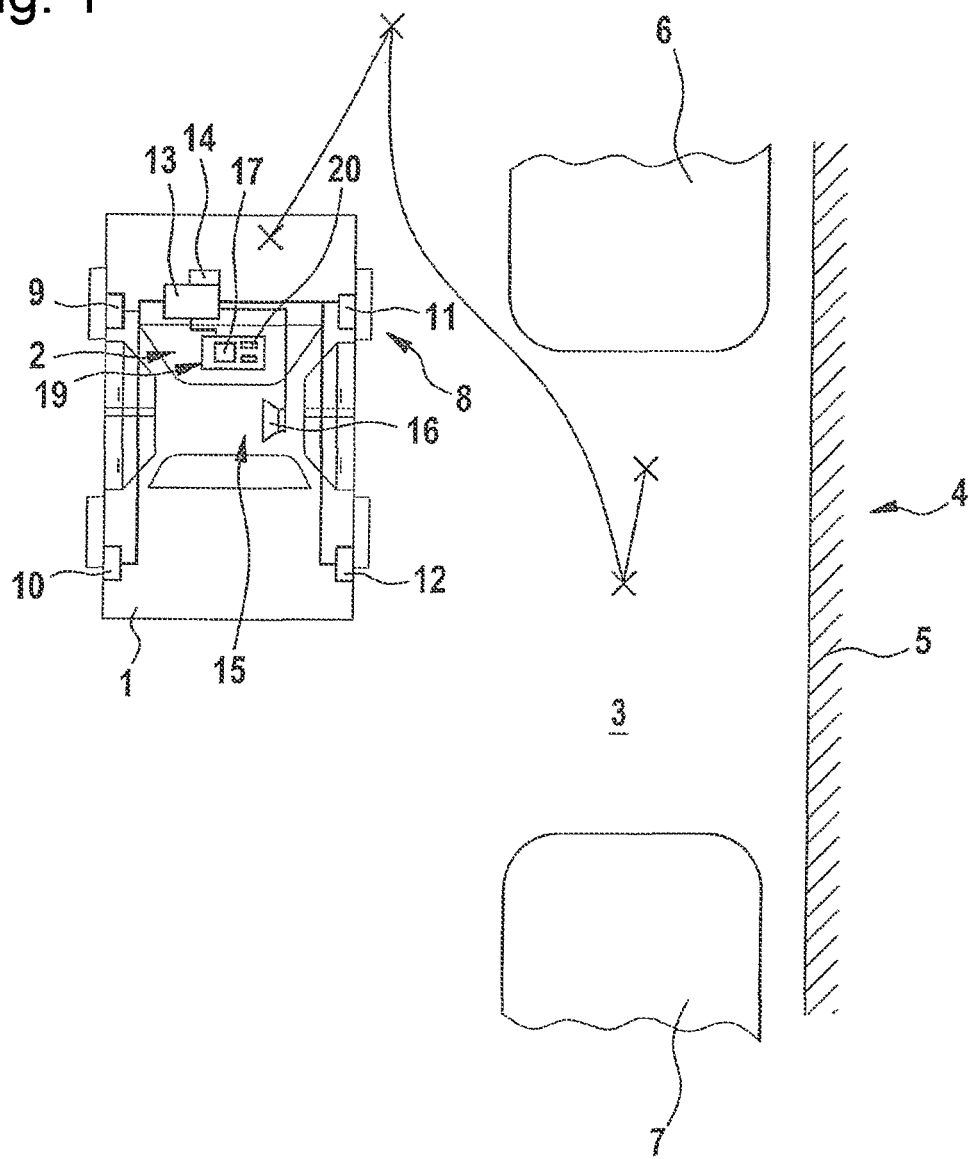
FIG. 1 shows a first parking situation involving a vehicle having a device for assisting in a parking maneuver of the vehicle into a parking space.

FIG. 1 shows a parking situation involving a vehicle 1 designed as a passenger vehicle and having a device 2 for assisting in a parking maneuver of vehicle 1 into a parking space 3 located at the side of vehicle 1. In the area of parking space 3 there is a first boundary object 4 which forms a lateral parking space boundary, boundary object 4 being a curb 5 here. In addition, a second boundary object 6 forming a front parking space boundary and a third boundary object 7 forming a rear parking space boundary are also situated in the area of parking space 3. Boundary objects 6 and 7 mentioned last each pertain to a vehicle that has already parked at curb 5.

Device 2 for assisting in the parking maneuver of vehicle 1 has a sensor array 8 which may have two distance measuring sensors 9, 11 designed as ultrasonic sensors mounted on the side of vehicle 1 for detecting the environment of vehicle 1, sensors 9, 11 being located here in the front area of vehicle 1. In addition and only as a supplement, two additional sensors 10, 12 are also provided in the rear-end area of vehicle 1 in this exemplary embodiment. Sensor array 8 is used in particular to detect parking space 3 and boundary objects 4, 6, 7 located in the area of parking space 3 while vehicle 1 is driving by parking space 3. Furthermore, device 2 is provided with an analyzer unit 13 connected to sensor array 8 and to a memory unit 14 located on analyzer unit 13.

Boundary object types for classification of detected boundary objects 4, 6, 7 are stored in memory unit 14. Parking information with regard to the feasibility of a parking maneuver of vehicle 1 into parking space 3 may be generated by analyzer unit 13 as a function of an assignment of stored boundary object types to detected boundary objects 4, 6, 7 and as a function of the position of boundary objects 4, 6, 7 in the area of parking space 3.

Device 2 for supporting the parking maneuver of vehicle 1 into parking space 3 operates in such a way that while vehicle 1 is driving by parking space 3, parking space 3 and boundary objects 4, 6, 7 located in the area of parking space 3 are detected by sensor array 8, which is connected to analyzer unit 13 and memory unit 14. Next, one of the boundary object types stored in memory unit 14 is assigned to each detected boundary object 4, 6, 7 by analyzer unit 13. Parking information regarding the feasibility of a parking maneuver into parking space 3 is generated next by analyzer unit 13 as a function of the assigned boundary object types and the particular position of boundary objects 4, 6, 7 in the area of parking space 3.

The generated parking information is transmitted acoustically and/or visually to an operator of vehicle 1, in particular a driver of vehicle 1, via an output means 15 having a loudspeaker 16 and/or a display screen 17. On the other hand, the parking information is used to determine a parking trajectory 18 of vehicle 1 into parking space 3 by analyzer unit 13. Display screen 13 is located in an operator's panel 19, which may also include input means 20 for manual processing of the contents of memory unit 14 according to the present exemplary embodiment.

Figure 2:
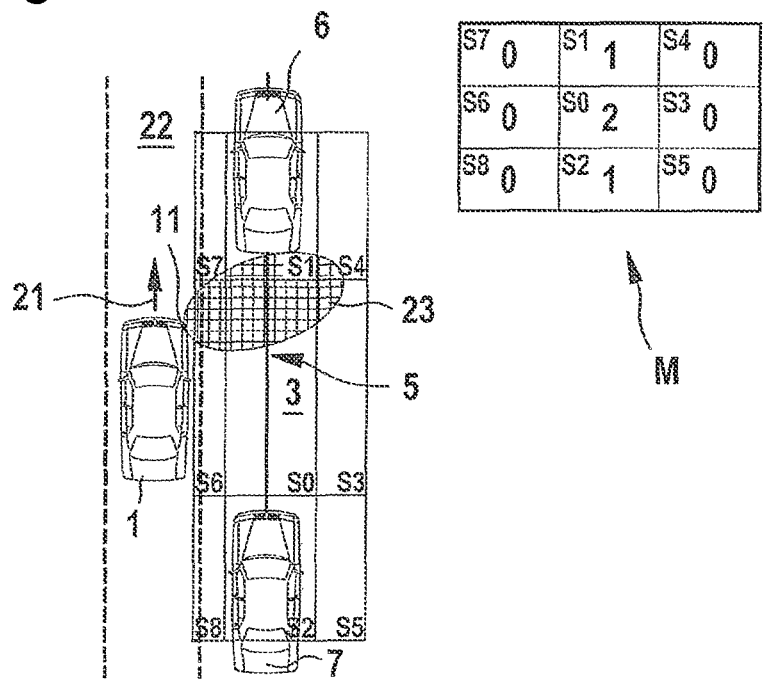
FIG. 2 shows a second parking situation involving a vehicle and a parking space.

FIG. 2 illustrates another example of a parking situation. A vehicle 1 corresponding to vehicle 1 according to FIG. 1 and having a device for assisting in a parking maneuver of vehicle 1 drives by a parking space 3 on a trajectory 22 in a forward direction indicated by an arrow 21. A sensor 11 of a sensor array (not shown further here) mounted in the front right corner area of vehicle 1 uses a sensor beam 23 to detect parking space 3 and boundary objects 4, 6, 7 located in the area of parking space 3, namely a curb 5 running through the center of parking space 3 as a first boundary object 4, a passenger vehicle already parked in front of parking space 3 as a second boundary object 6, and a passenger vehicle already parked behind parking space 3 as a third boundary object 7.

An analyzer unit of the device for assisting in the parking maneuver of vehicle 1 subdivides the area of parking space 3 into several segments S0-S8, namely an arrangement of 3×3 segments. For each of nine segments S0-S8, a boundary object type stored in the memory unit of the aforementioned device is assigned to a boundary object detected in the particular segment. A catalog of boundary object types stored in the memory unit has the following content in this exemplary embodiment, with one of code numbers 0-7 being assigned to each object type:

| | |
|---|---|
| Boundary object empty = | 0 |
| Boundary object passenger vehicle = | 1 |
| Boundary object curb = | 2 |
| Boundary object motorcycle = | 3 |
| Boundary object person = | 4 |
| Boundary object round object = | 5 |
| Boundary object shrub = | 6 |
| Boundary object truck = | 7 |

It should be pointed out in particular that the boundary object may also be of the object type "empty" (corresponding to code number 0), so that a boundary object type may be assigned to each segment. Code number 0 is assigned when no boundary object is present in the particular segment.

FIG. 2 shows the assignment of code numbers to individual segments in a matrix M. The contents of matrix M may be given as a numerical sequence [2 1 1 0 0 0 0 0] which reflects the actual parking space pattern in the parking situation according to FIG. 2 as the actual status of the present parking situation.

The actual parking space pattern is compared with acceptable parking space patterns stored in the memory unit in the form of a table, which is conventionally known as a look-up table. The look-up table in this example has the following contents:

[0 1 1 0 0 0 0 0]
[0 1 3 0 0 0 0 0]
...
[2 1 1 0 0 0 0 0]
...
[2 5 1 0 0 0 0 0]
...
[2 5 5 2 0 0 0 0]
[2 5 5 2 0 0 2 2 2]

It is apparent here that the actual parking space pattern corresponds to one of the acceptable parking space patterns. Consequently, the analyzer unit of the device for assisting in a parking maneuver of vehicle 1 generates parking information indicating the feasibility of a parking maneuver into parking space 3. In this example, the acceptability of driving over curb 5 in central segment S0 of the area of parking space 3 is assumed.

It is essentially conceivable that before detection of parking space 3, at least a part of an acceptable parking space pattern is predetermined by an operator, in particular a driver, of vehicle 1 via an input means 20 (see FIG. 1) of the device for assisting in a parking maneuver of vehicle 1 and is stored in the memory unit. The operator would then be able to remove the parking space pattern in this example from the look-up table to reduce the risk of damage to rims on his vehicle 1.

Figure 3:
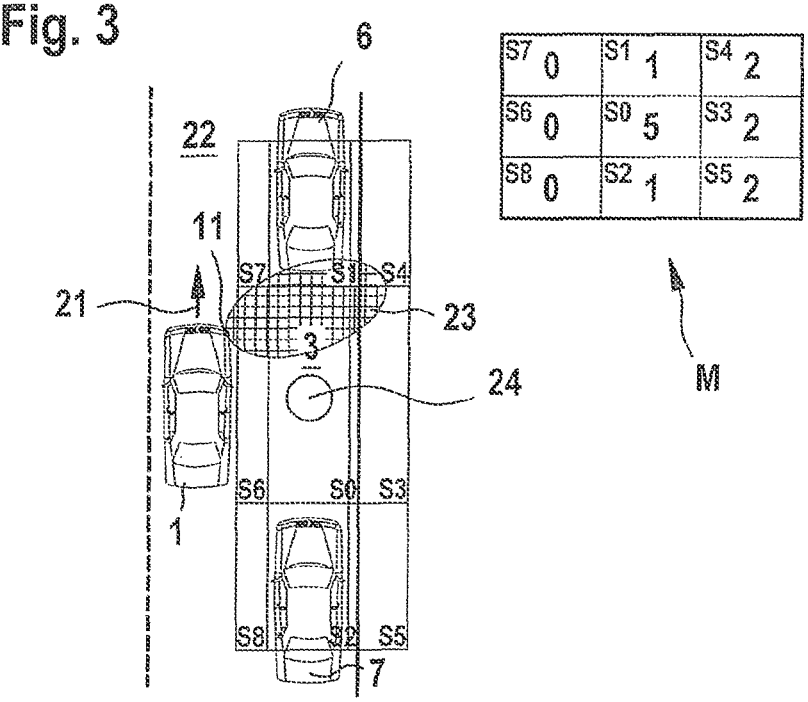
FIG. 3 shows a third parking situation involving a vehicle and a parking space.

FIG. 3 shows a third parking situation in a diagram similar to that of FIG. 2. Reference is made to FIG. 2 with regard to corresponding elements. In deviation from the example according to FIG. 2, a round object 24 is situated in the central segment S0 of the area of a parking space 3 in the example according to FIG. 3 and a curb 5 forms a side parking space boundary.

The catalog of boundary object types corresponds to that in the exemplary embodiment according to FIG. 2. The actual parking space pattern according to FIG. 3 is described by numerical sequence [5 1 1 2 2 2 0 0 0]. The look-up table has the following contents:

[0 1 1 0 0 0 0 0]
[0 1 3 0 0 0 0 0]
...
[0 5 1 0 0 0 0 0]
...
[2 1 1 0 0 0 0 0]
...
[2 5 5 2 0 0 0 0]
[2 5 5 2 0 0 2 2 2]

The actual parking space pattern here is not contained in the look-up table. The analyzer unit generates parking information stating that parking in parking space 3 is impossible.

Figure 4:
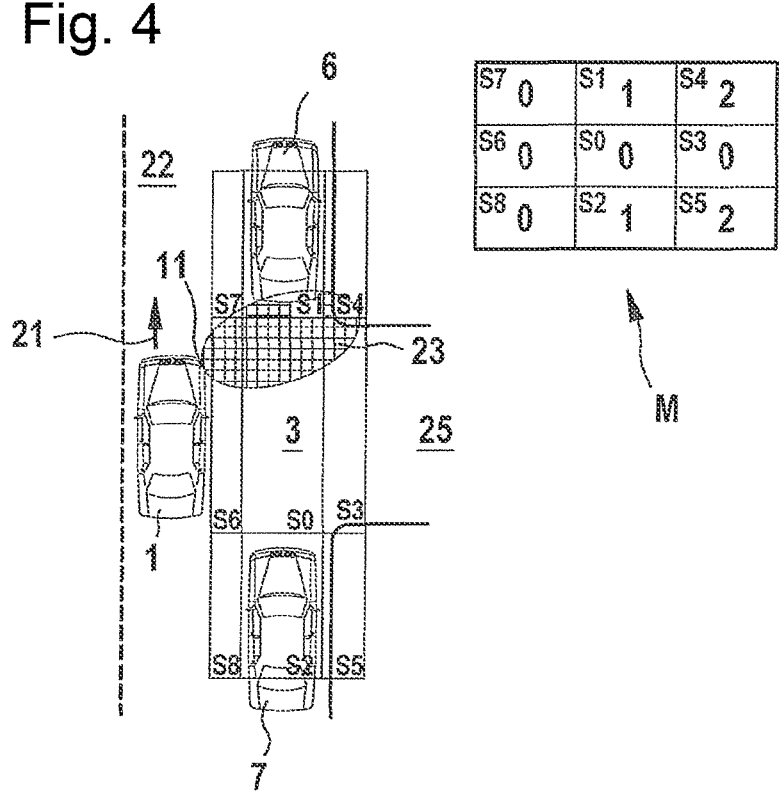
FIG. 4 shows a fourth parking situation involving a vehicle and a parking space.

FIG. 4 shows a fourth parking situation in a diagram like those of preceding FIGS. 2, 3. With regard to corresponding elements, reference is made to the description of these FIGS. 2, 3.

In the example according to FIG. 4, an opening 25 appears at the level of a parking space 3. The catalog of boundary object types corresponds to that of the exemplary embodiments according to FIGS. 2, 3. The actual parking space pattern according to FIG. 4 is described by numerical sequence [0 1 1 0 2 2 0 0 0]. The look-up table has the following contents:

[0 1 1 0 0 0 0 0]
[0 1 3 0 0 0 0 0]
...
[0 5 1 0 0 0 0 0]
...
[2 1 1 0 0 0 0 0]
...
[2 5 5 2 0 0 0 0]
[2 5 5 2 0 0 2 2 2]

Again in this exemplary embodiment, the actual parking space pattern is not contained in the look-up table. The analyzer unit generates parking information indicating that parking in parking space 3 is impossible. This avoids parking of a vehicle 1 in parking space 3 which would interfere with traffic flow. In particular, however—as also in the example according to FIG. 3—the driver of vehicle 1 is relieved because he is not bombarded with too much information about a parking space 3 that would presumably be suitable for parking because of its geometric dimensions by the device installed in vehicle 1 to assist in a parking maneuver in a situation in which the driver himself would then have to recognize parking space 3 as unsuitable and disregard it. The method described above for generating parking information taking into account the type and position of boundary objects thus avoids unnecessary distraction of the driver.

What is claimed is:
1. A method for assisting in a parking maneuver for a motor vehicle into a parking space, the method comprising:
   driving the vehicle by a parking space;
   while the vehicle is driving by the parking space, detecting the parking space and a boundary object located in an area of the parking space by a sensor array;
   assigning, using a processor, a boundary object type to the detected boundary object; and
   generating, using the processor, parking information about a feasibility of a parking maneuver into the parking space as a function of the assigned boundary object type and a position of the boundary object in the area of the parking space;
   wherein the area of the parking space is subdivided into a plurality of segments and, for each segment, a boundary object type is assigned to a corresponding boundary object detected in the segments, and wherein the area of the parking space is subdivided into an arrangement of 3×3 segments.

2. The method of claim 1, wherein before a parking space is detected, at least part of an acceptable parking space pattern is predetermined by a user of the vehicle.

3. The method of claim 1, wherein the parking information is transmitted to the user of the vehicle.

4. The method of claim 1, wherein a parking trajectory into the parking space is determined based on the parking information.

5. The method of claim 1, wherein a parking space pattern of the parking space including all segments having a particular assigned boundary object type is compared to acceptable parking space patterns, and the parking information is generated as a function of the comparison of the parking space pattern to the acceptable parking space patterns.

6. The method of claim 1, wherein a parking space pattern of the parking space that includes all the segments having the particular assigned boundary object type is compared to acceptable relationships of boundary object types of a plurality of boundary objects detected in the areas of the parking space to one another, and the parking information is generated as a function of the comparison of the parking space pattern to the acceptable relationships of boundary object types.

7. The method of claim 1, wherein before detection of the parking space, at least part of an acceptable parking space pattern is predetermined, wherein the parking information is transmitted to the user of the vehicle, and wherein a parking trajectory into the parking space is determined based on the parking information.

8. A method for assisting in a parking maneuver for a motor vehicle into a parking space, the method comprising:
    driving the vehicle by a parking space;
    while the vehicle is driving by the parking space, detecting the parking space and a boundary object located in an area of the parking space by a sensor array;
    assigning, using a processor, a boundary object type to the detected boundary object; and
    generating, using the processor, parking information about a feasibility of a parking maneuver into the parking space as a function of the assigned boundary object type and a position of the boundary object in the area of the parking space;
    wherein the area of the parking space is subdivided into a plurality of segments and, for each segment, a boundary object type is assigned to a corresponding boundary object detected in the segments, and
    wherein a parking space pattern of the parking space including all segments having a particular assigned boundary object type is compared to acceptable parking space patterns, and the parking information is generated as a function of the comparison of the parking space pattern to the acceptable parking space patterns.

9. A method for assisting in a parking maneuver for a motor vehicle into a parking space, the method comprising:
    driving the vehicle by a parking space;
    while the vehicle is driving by the parking space, detecting the parking space and a boundary object located in an area of the parking space by a sensor array;
    assigning, using a processor, a boundary object type to the detected boundary object; and
    generating, using the processor, parking information about a feasibility of a parking maneuver into the parking space as a function of the assigned boundary object type and a position of the boundary object in the area of the parking space;
    wherein the area of the parking space is subdivided into a plurality of segments and, for each segment, a boundary object type is assigned to a corresponding boundary object detected in the segments, and
    wherein a parking space pattern of the parking space that includes all the segments having the particular assigned boundary object type is compared to acceptable relationships of boundary object types of a plurality of boundary objects detected in the areas of the parking space to one another, and the parking information is generated as a function of the comparison of the parking space pattern to the acceptable relationships of boundary object types.

10. A device for assisting in a parking maneuver of a motor vehicle into a parking space, comprising:
    a sensor array for detecting a parking space and a boundary object located in an area of the parking space while the vehicle is driving by the parking space;
    an analyzer unit connected to the sensor array and having a memory unit, the boundary object types being stored in the memory unit, to generate parking information about a feasibility of a parking maneuver into the parking space as a function of an assignment of one of the stored boundary object types to the detected boundary object and of a position of the boundary object in the area of the parking space;
    wherein the area of the parking space is subdivided into a plurality of segments and, for each segment, a boundary object type is assigned to a corresponding boundary object detected in the segments,
    wherein the area of the parking space is subdivided into an arrangement of 3×3 segments, and
    wherein a parking space pattern of the parking space including all segments having a particular assigned boundary object type is compared to acceptable parking space patterns, and the parking information is generated as a function of the comparison of the parking space pattern to the acceptable parking space patterns.

11. The device of claim 10, wherein there is an input arrangement for input of at least a portion of an acceptable parking space pattern into the memory unit by a user of the vehicle.

12. The device of claim 10, wherein there is an output arrangement for transmitting the parking information to the user of the vehicle.

13. The device of claim 10, wherein the sensor array has at least one distance measuring sensor.

14. The device of claim 10, wherein there is an input arrangement for input of at least a portion of an acceptable parking space pattern into the memory unit, and wherein there is an output arrangement for transmitting the parking information to the user of the vehicle.

15. The device of claim 14, wherein the sensor array has at least one distance measuring sensor.

16. A device for assisting in a parking maneuver of a motor vehicle into a parking space, comprising:
    a sensor array for detecting a parking space and a boundary object located in an area of the parking space while the vehicle is driving by the parking space;
    an analyzer unit connected to the sensor array and having a memory unit, the boundary object types being stored in the memory unit, to generate parking information about a feasibility of a parking maneuver into the parking space as a function of an assignment of one of the stored boundary object types to the detected boundary object and of a position of the boundary object in the area of the parking space;

wherein the area of the parking space is subdivided into a plurality of segments and, for each segment, a boundary object type is assigned to a corresponding boundary object detected in the segments, wherein the area of the parking space is subdivided into an arrangement of 3×3 segments, and wherein a parking space pattern of the parking space that includes all the segments having the particular assigned boundary object type is compared to acceptable relationships of boundary object types of a plurality of boundary objects detected in the areas of the parking space to one another, and the parking information is generated as a function of the comparison of the parking space pattern to the acceptable relationships of boundary object types.

17. A device for assisting in a parking maneuver of a motor vehicle into a parking space, comprising:

a sensor array for detecting a parking space and a boundary object located in an area of the parking space while the vehicle is driving by the parking space;

an analyzer unit connected to the sensor array and having a memory unit, the boundary object types being stored in the memory unit, to generate parking information about a feasibility of a parking maneuver into the parking space as a function of an assignment of one of the stored boundary object types to the detected boundary object and of a position of the boundary object in the area of the parking space;

wherein the area of the parking space is subdivided into a plurality of segments and, for each segment, a boundary object type is assigned to a corresponding boundary object detected in the segments, and wherein a parking space pattern of the parking space including all segments having a particular assigned boundary object type is compared to acceptable parking space patterns, and the parking information is generated as a function of the comparison of the parking space pattern to the acceptable parking space patterns.

18. The device of claim 17, wherein a parking space pattern of the parking space that includes all the segments having the particular assigned boundary object type is compared to acceptable relationships of boundary object types of a plurality of boundary objects detected in the areas of the parking space to one another, and the parking information is generated as a function of the comparison of the parking space pattern to the acceptable relationships of boundary object types.

* * * * *